United States Patent [19]
Kawai et al.

[11] Patent Number: 6,122,105
[45] Date of Patent: *Sep. 19, 2000

[54] OPTICAL APPARATUS AND OPTICAL SYSTEM

[75] Inventors: Tatsundo Kawai, Hadano; Masami Tabata, Isehara, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/902,158

[22] Filed: Jul. 29, 1997

[30] Foreign Application Priority Data

Aug. 2, 1996 [JP] Japan ..................................... 8-204901
Jul. 14, 1997 [JP] Japan ..................................... 9-188217

[51] Int. Cl.$^7$ .............................. G02B 27/10; G02B 3/02
[52] U.S. Cl. .......................... 359/618; 359/611; 359/718
[58] Field of Search ................................... 359/738, 611, 359/618

[56] References Cited

U.S. PATENT DOCUMENTS

| | | | |
|---|---|---|---|
| 3,574,283 | 4/1971 | Albers | 73/178 |
| 5,504,317 | 4/1996 | Takahashi | 235/462 |
| 5,572,285 | 11/1996 | Takagi | 355/27 |
| 5,619,306 | 4/1997 | Baxter et al. | 355/97 |
| 5,703,605 | 12/1997 | Takahashi et al. | 359/738 |

*Primary Examiner*—Scott J. Sugarman
*Assistant Examiner*—Michael Lucas
*Attorney, Agent, or Firm*—Fitzpatrick, Cella, Harper & Scinto

[57] ABSTRACT

In an image reading device in which an original is illuminated by a light source, and a reflected beam from the original is imaged on a sensor through a rod lens array, a light-shielding member is arranged between the beam exit surface of the light source and the incident surface of the rod lens array to prevent the beam from the light source from being directly incident on the rod lens array to cause a flare. An image reading device and information processing apparatus in which the image quality is rarely degraded by the flare beam are provided.

40 Claims, 5 Drawing Sheets

OPTICAL APPARATUS AND OPTICAL SYSTEM

BACKGROUND OF THE INVENTION

1. Field of the Invention

The present invention relates to an optical apparatus and optical system for illuminating a predetermined target object by a light source.

2. Related Background Art

Conventionally, reading devices used in a facsimile apparatus, an electronic copying machine, and other information processing apparatuses, use as an illumination unit for illuminating an original to be read, a discharge tube such as a fluorescent tube, and an LED array prepared by arranging many LED (Light Emitting Diode) chips in an array. Particularly in recent years, most of reading devices use LED arrays in the facsimile apparatus and the like because small, low-cost products are required along with the use in home. To decrease the number of LED chips to be used and realize a lower-cost product, some reading devices employ a light source in which an LED chip is arranged at the end portion of a rod-shaped transparent member formed of a transparent glass, a resin, or the like, and a beam emitted from the LED chip is linearly expanded using internal reflection inside the transparent member to irradiate the beam onto the original surface to be read.

FIG. 7 is a sectional view showing such a reading device. In FIG. 7, an original A has an image to be read on its surface. A light source B illuminates the original. A rod lens array C images a beam reflected by the original surface on a sensor surface. A sensor (also called line sensor) D is arranged in this reading device. A housing E holds the light source B, the rod lens array C, and the sensor D. A glass plate F holds the original A.

The light source B is constituted by combining a rod-shaped light guide 3 having an area 5 for reflecting and/or scattering the beam on part of its surface and formed from a transparent material, and an LED chip (not shown) arranged at an end portion of the transparent member.

FIG. 8 is a schematic view for explaining the function of the light source indicated by B in FIG. 7. FIG. 8 is a perspective view additionally showing an LED chip 1 arranged at an end portion of the light guide 3.

A beam emitted from the LED chip 1 and incident into the light guide 3 is repeatedly reflected by the inner surface of the light guide 3 and propagates in the light guide 3. When the beam is incident on an area 5 during the repeated reflection, it is diffused. Since the diffused beam ceases to satisfy the total reflection conditions, it emerges from the light guide 3, and its part linearly illuminates the target reading area of the original.

If only an LED chip having a single emission color is used as the LED chip 1, the reading device reads monochromatic image information. If color image information is to be read, a plurality of LED chips having different emission colors such as red, blue, and green are arranged. The LED chips having the respective emission colors are sequentially switched at a high speed, and caused to emit beams. In synchronism with this, accumulation and read-out of signal changes are performed in the sensor D.

For example, when, of the LED chips arranged at the end portion of the transparent member B, the red-light-emitting chip emits a beam, the target reading portion of the original is illuminated with a red beam. At this time, the beam reflected by the original and imaged by the converging rod lens array C gives red information of the image on the original surface to a signal to be accumulated as an accumulated charge in the sensor D. When the blue- and green-light-emitting LED chips emit beams, signals have blue information and green information, respectively.

In this reading device, a beam exit surface 6 of the light source B is located near the rod lens array C, unlike in a reading device using an LED array. For this reason, part of the beam which emerges from the beam exit surface 6 of the light source B, or part of the beam reflected by the housing E is directly incident on an incident surface C-1 of the rod lens array C, and becomes an unwanted flare beam which degrades the quality of the read image.

SUMMARY OF THE INVENTION

It is an object of the present invention to provide a high-performance optical apparatus and optical system.

It is another object of the present invention to provide an optical apparatus and optical system in which the image quality is rarely degraded by a flare beam.

To achieve the above objects, according to an aspect of the present invention, there is provided an optical apparatus comprising a light source for illuminating a target object, an imaging member for imaging light coming from the target object illuminated by the light source at a predetermined imaging position, and a light-shielding member for shielding the light coming from the light source so as not to be directly incident on the imaging member.

According to another aspect of the present invention, there is provided an optical system comprising a light source for illuminating a target object, an imaging member for imaging light coming from the target object illuminated by the light source at a predetermined imaging position, a light-shielding member for shielding the light coming from the light source so as not to be directly incident on the imaging member, and control means for ON/OFF-controlling the light source.

Other objects, features and advantages of the present invention will be apparent from the following description of the preferred embodiments in conjunction with the accompanying drawings.

DESCRIPTION OF THE PREFERRED EMBODIMENTS

Figure 1:
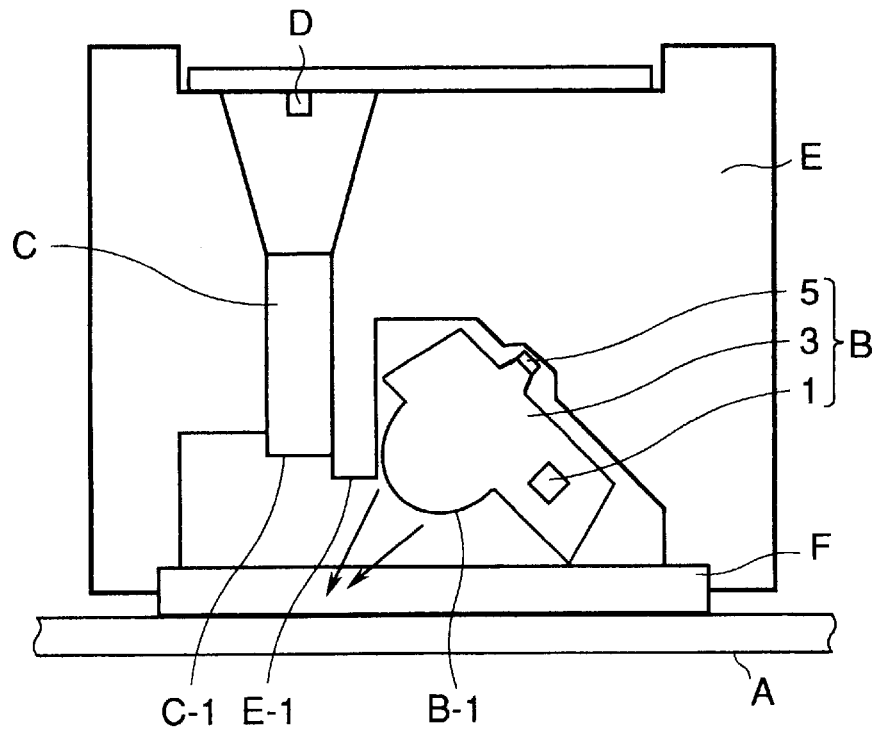
FIG. 1 is a perspective view showing an arrangement according to the first embodiment.

FIG. 1 is a perspective view of an "image reading device" according to the first embodiment of the present invention.

In FIG. 1, an original A has an image to be read on its surface. A light source B illuminates the original A. A rod lens array C is an imaging member for imaging a beam reflected by the original surface on a sensor surface. A sensor D is arranged in this image reading device. A housing E holds the light source B, the rod lens array C, and the sensor D. A glass plate F holds the original A.

The light source B is constituted by combining a rod-shaped light guide 3 having an area 5 for reflecting and/or scattering the beam on part of its surface and formed from a transparent material, and an LED chip 1 arranged at an end portion of the light guide 3 in the longitudinal direction.

In this embodiment, part of the housing E projects between a beam exit surface B-1 of the light source B and an incident surface C-1 of the rod lens array C to form a light-shielding member E-1. With this arrangement, a beam emerging from the beam exit surface B-1 of the light source B and due to be directly incident on the incident surface C-1 of the rod lens array C, and a beam reflected by the housing E and doe to be directly incident on the incident surface C-1 of the rod lens array C are cut. Therefore, an unwanted flare beam can be eliminated, and a high-quality read image can be obtained.

Figure 2:
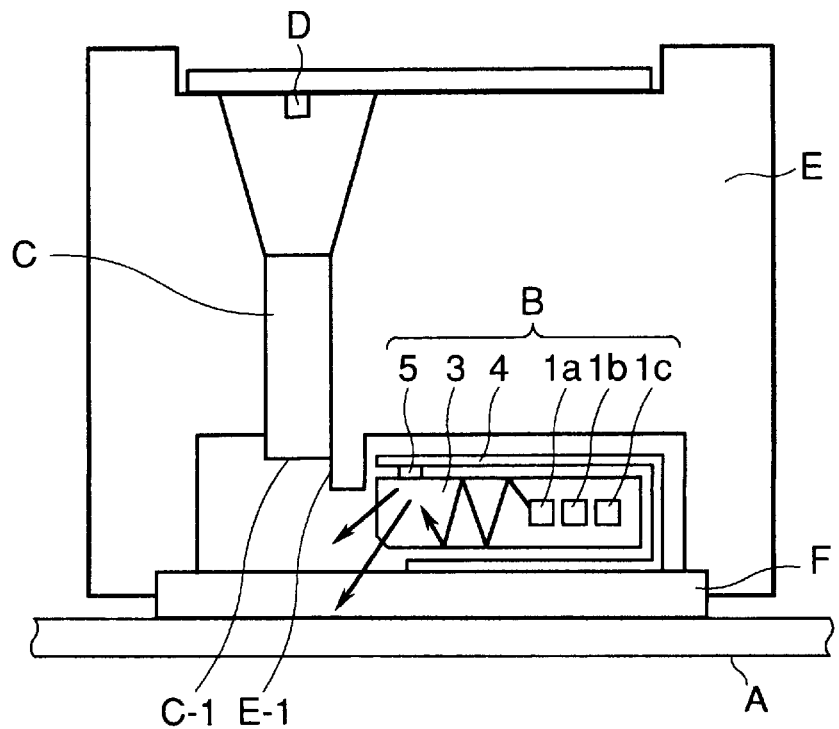
FIG. 2 is a perspective view showing an arrangement according to the second embodiment.

FIG. 2 is a perspective view of an "image reading device" according to the second embodiment of the present invention.

In FIG. 2, an original A has an image to be read on its surface. A light source B illuminates the original A. A rod lens array C images a beam reflected by the original surface on a sensor surface. A sensor D is arranged in this image reading device. A housing E holds the light source B, the rod lens array C, and the sensor D. A glass plate F holds the original A.

In this embodiment, the light source B is constituted by combining a rod-shaped light guide 3 having an area 5 for reflecting and/or scattering the beam on part of its surface and formed from a transparent material, a light-reflecting covering member 4 covering the light guide 3, and an LED chip arranged at an end portion of the light guide 3. In this embodiment, three LED chips 1a, 1b, and 1c having different emission wavelengths are arranged to allow reading of color image information.

The beam exit surface of the light source B is arranged slightly apart from an incident surface C-1 of the rod lens array C. Part of the housing E projects between the beam exit surface of the light source B and the incident surface C-1 of the rod lens array C to form a light-shielding member E-1. With this arrangement, a beam emerging from the beam exit surface of the light source B and due to directly enter the incident surface C-1 of the rod lens array C, and a beam reflected by the housing E and due to directly enter the incident surface C-1 of the rod lens array C are cut. Therefore, an unwanted flare beam can be eliminated, and a high-quality read image can be obtained.

Figure 3:
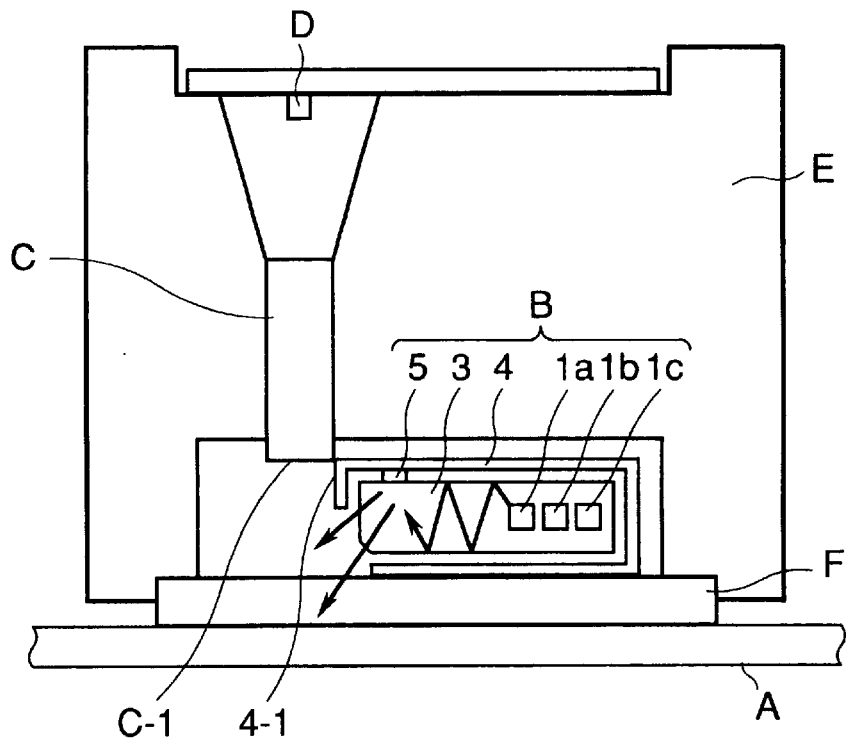
FIG. 3 is a perspective view showing an arrangement according to the third embodiment.

FIG. 3 is a perspective view of an "image reading device" according to the third embodiment of the present invention.

In this embodiment, part of a light-reflecting covering member 4 which covers a light guide 3 is extended (4-1) to cover the upper portion of a beam exit surface, as shown in FIG. 3. With this arrangement, a beam emerging from the beam exit surface of a light source B and due to directly reach an incident surface C-1 of a rod lens array C, and a beam reflected by a housing E and due to directly reach the incident surface C-1 of the rod lens array C are cut. Therefore, an unwanted flare beam can be eliminated, and a high-quality read image can be obtained. Also in this embodiment, three LED chips 1a, 1b, and 1c having different emission wavelengths are arranged to allow reading of color image information.

Figure 4:
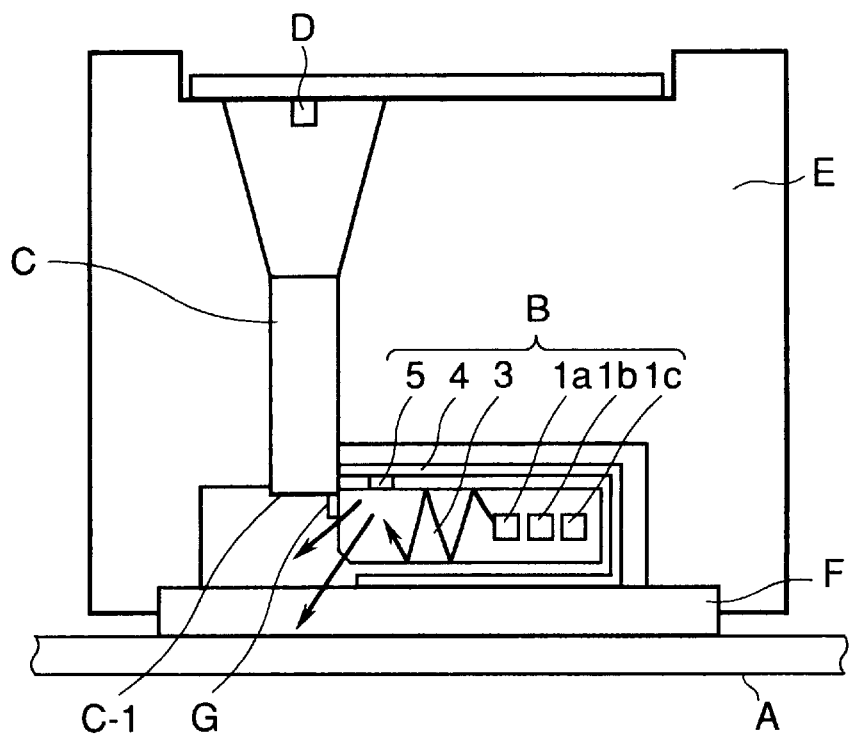
FIG. 4 is a perspective view showing an arrangement according to the fourth embodiment.

FIG. 4 is a perspective view of an "image reading device" according to the fourth embodiment of the present invention.

In this embodiment, parts of members constituting a light source B such as a light guide 3 and a light-reflecting covering member 4 covering the light guide 3 are arranged in contact with the side surface of a rod lens array C, and used as a holding member for the rod lens array C. A light-shielding member G for shielding an incident surface C-1 of the rod lens array C and the beam exit surface of the light source B from light is adhered to part of the beam exit surface of the light source B. With this arrangement, a beam emerging from the beam exit surface of the light source B and due to directly strike the incident surface of the rod lens array C, and a beam reflected by a housing E and due to directly strike the incident surface C-1 of the rod lens array C are cut. Therefore, an unwanted flare beam can be eliminated, and a high-quality read image can be obtained. Also in this embodiment, three LED chips 1a, 1b, and 1c having different emission wavelengths are arranged to allow reading of color image information.

Figure 5:
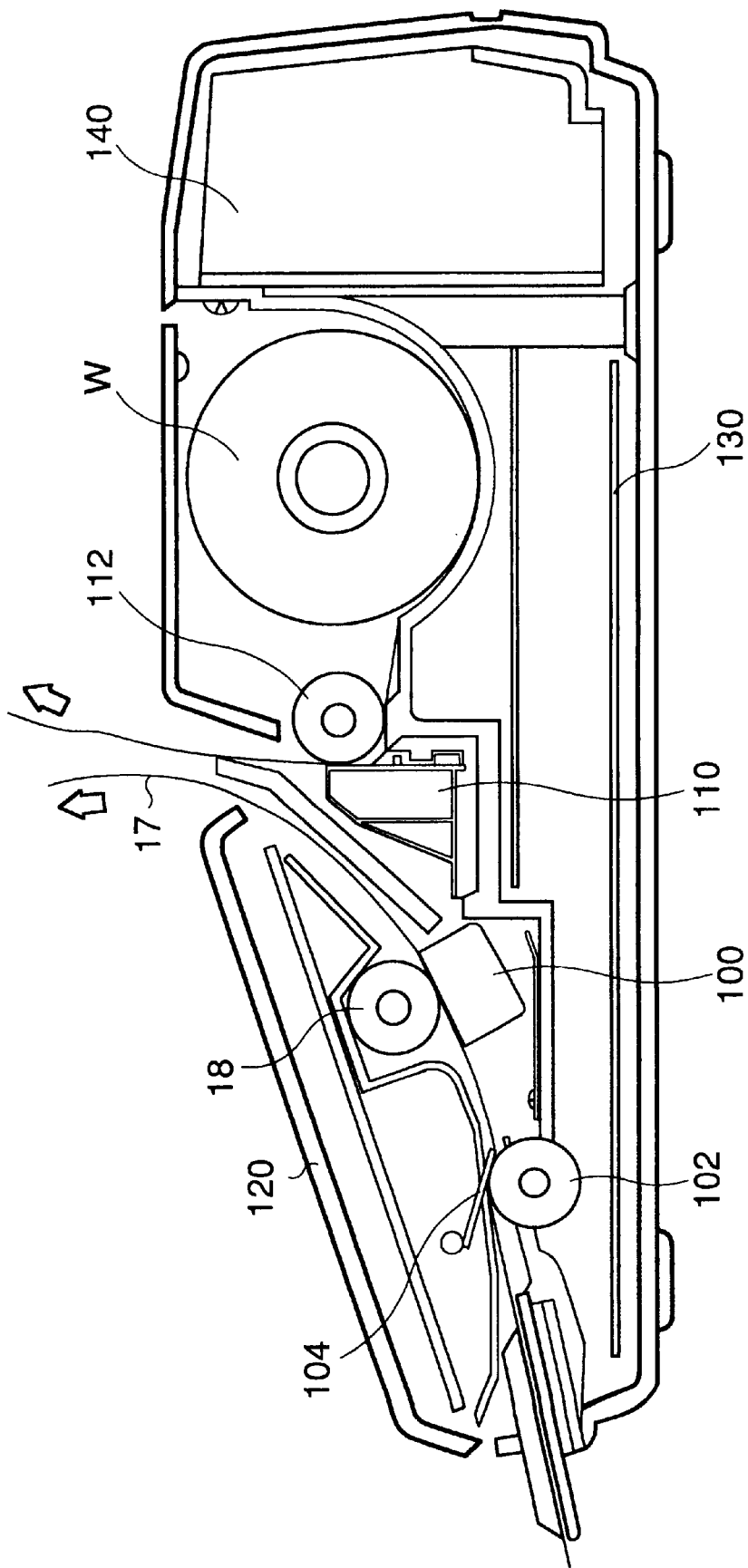
FIG. 5 is a sectional view showing an arrangement according to the fifth embodiment.

FIG. 5 shows an embodiment of an "information processing apparatus" using the image reading device of one of the above-described embodiments.

In FIG. 5, an image reading device 100 according to any one of the first to fourth embodiments is arranged. A paper feed roller 102 feeds an original 17 to a reading position. A separating piece 104 reliably separates originals one by one. A convey roller 18 is arranged at the reading position of the image reading device 100 to regulate the target reading surface of the original and convey the original. A recording medium W is a roll of paper in the embodiment shown in FIG. 5. A recording head 110 forms an image, and is a thermal head, an ink-jet recording head, or the like. A platen roller 112 conveys the recording medium W to the recording position of the recording head 110, and regulates its recorded surface. An operation panel 120 has a switch for receiving an operation input, a display portion for displaying messages and the status of the reading device, and the like. A system control board 130 has a control portion for controlling the respective portions, a driving circuit for controlling the ON/OFF of a light source B (see FIGS. 1–4) of the image reading device 100, and driving of a sensor D (see FIGS. 1–4), an image information processing portion, a transmission/reception portion, and the like. A power supply 140 is arranged on the reading device.

In this embodiment, the information processing apparatus is a facsimile apparatus having a transmission/reception function. However, it may be an information processing apparatus of another type such as a scanner which reads image information and sends it to a computer or the like.

Figure 6:
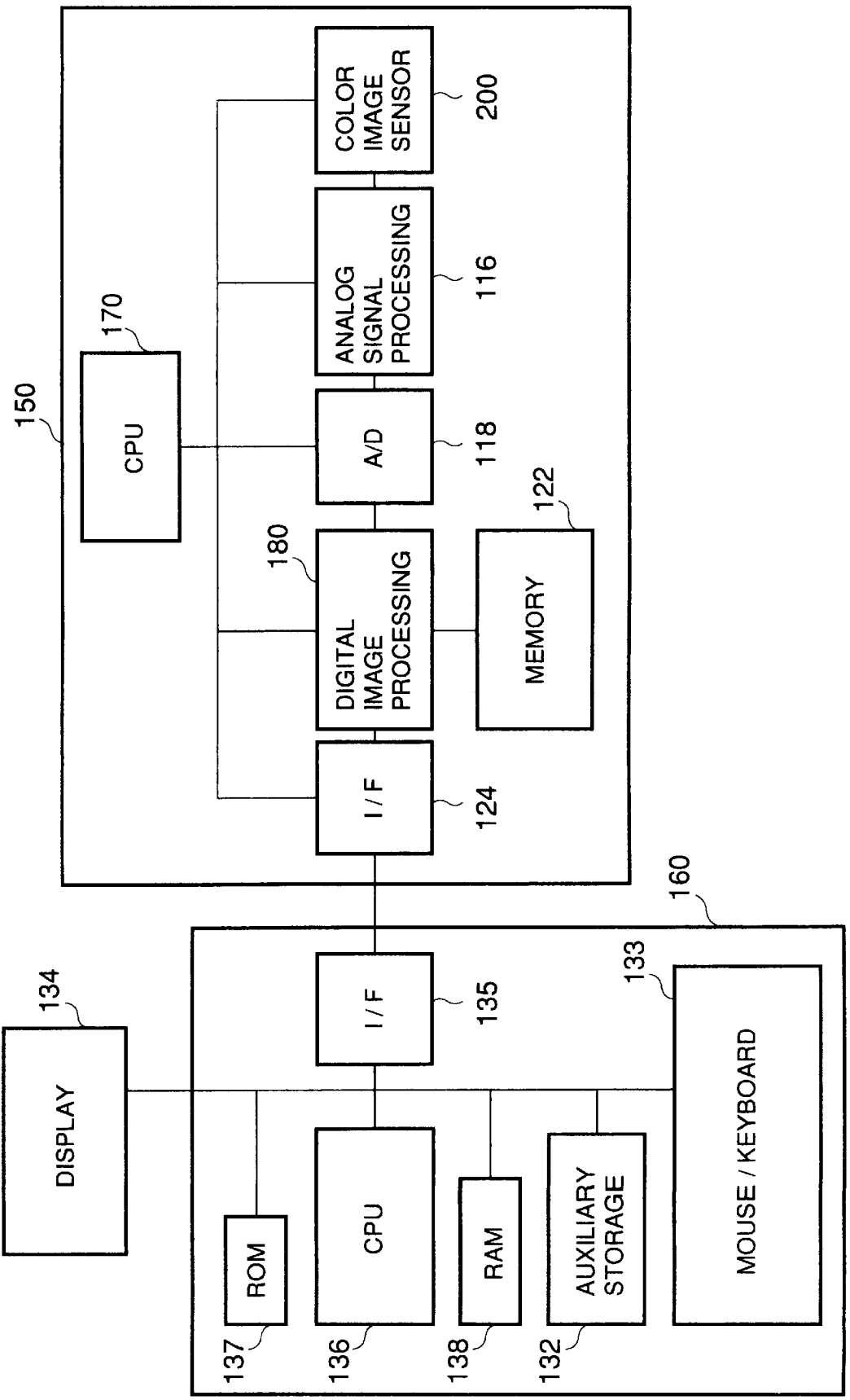
FIG. 6 is a block diagram showing an arrangement according to the sixth embodiment.
Figure 7:
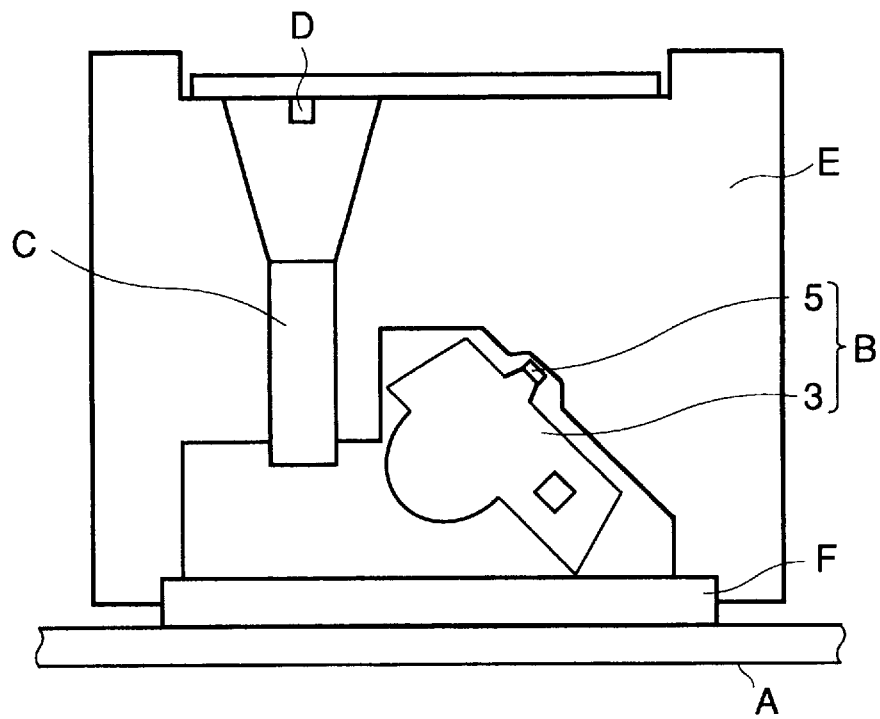
FIG. 7 is a sectional view of a prior art.
Figure 8:
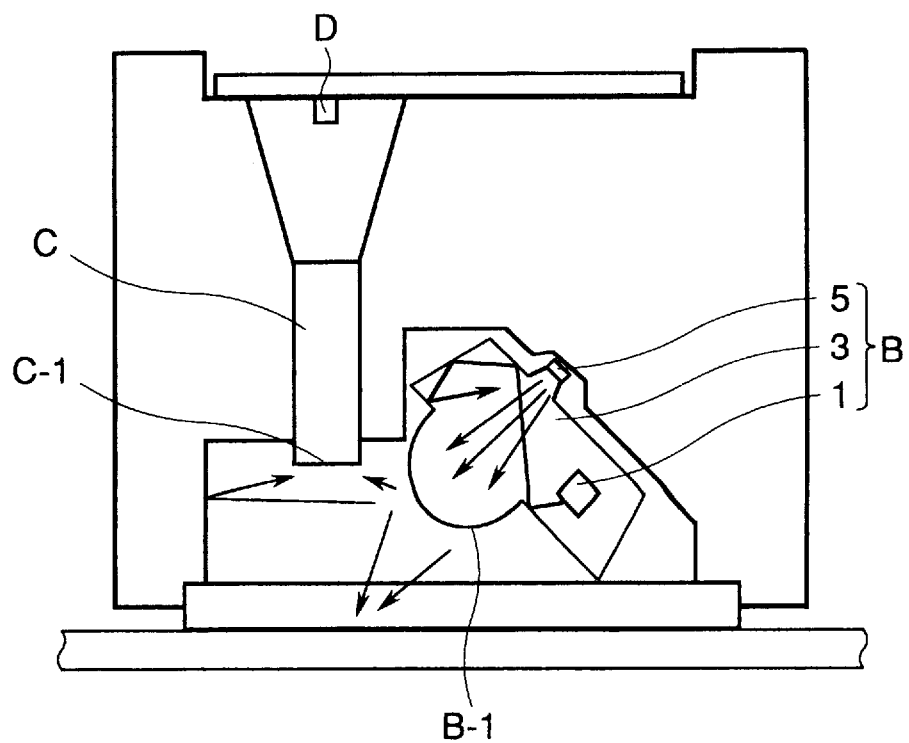
FIG. 8 is a perspective view for explaining the prior art.

FIG. 6 shows an example of an information processing apparatus constituted by using the image sensor described in each embodiment. An example of an arrangement wherein an image reading device 150 incorporating an image sensor 200 is connected to a personal computer 160 to constitute a system, and read image information is sent to a computer or a network will be described.

In FIG. 6, a CPU 170 serves as the first control means for controlling the whole image reading device 150. The color image sensor 200 serves as a reading unit constituted by the above-described light source, CCD line sensor, and the like to convert an original image into an image signal. An analog signal processing circuit 116 performs analog processing such as gain adjustment for an analog image signal output from the color image sensor 200.

An A/D converter 118 converts an output from the analog signal processing circuit 116 into a digital signal. An image processing circuit 180 performs image processing such as shading correction, gamma conversion, and variable magnification for output data from the A/D converter 118 by using a memory 122. An interface 124 outputs digital image data having undergone image processing by the image processing circuit 180 to the outside. The interface 124 complies with a standard normally employed in a personal computer, e.g., SCSI or Bi-Centronics, and is connected to the personal computer 160. The analog signal processing circuit 116, the A/D converter 118, the image processing circuit 180, and the memory 122 constitute a signal processing means.

The personal computer 160 serving as the second control means is equipped with a magneto-optical disk drive or floppy disk drive as an external storage device or auxiliary storage device 132. A display 134 displays operations on the personal computer 160. A mouse/keyboard 133 allows the user to input a command and the like to the personal computer. An interface 135 allows the exchange of data, a command, and the state information of the image reading device between the personal computer and the image reading device.

The CPU 136 of the personal computer 160 allows the user to input a reading instruction to the CPU 170 of the image reading device through the mouse/keyboard 133. When a reading instruction is input through the mouse/keyboard 133, a CPU 136 sends a reading command to the CPU 170 of the image reading device through the interface 135. The CPU 136 of the personal computer 160 controls the CPU 170 of the image reading device in accordance with control program information stored in a ROM 137, and the CPU 170 controls the light source, driving of the CCD and the signal processing means. This control program may be stored in a storage medium such as a magneto-optical disk, a floppy disk, or the like loaded in the auxiliary storage device 132, read into the personal computer 160, and executed by the CPU 136.

The present invention is applicable to an optical apparatus or system in addition to the image reading device as long as the apparatus or system has a light source and an imaging member.

Each of the above-described embodiments has exemplified the case wherein the LED is used as a light emitting element. However, the present invention is not limited to this, and another light emitting element may be used.

With the above-described arrangement, part of a beam emerging from the beam exit surface of the light source, and part of a beam reflected by the housing can be prevented from being directly incident on the incident surface of the imaging member, thereby obtaining a high-quality image.

Many widely different embodiments of the present invention may by constructed without departing from the spirit and scope of the present invention. It should be understood that the present invention is not limited to the specific embodiments described in the specification, except as defined in the appended claims.

What is claimed is:

1. An optical apparatus comprising:
   (a) a light source for illuminating a target object;
   (b) an imaging member for imaging light from the target object illuminated by said light source at an imaging position; and
   (c) a light-shielding member for shielding the light coming from said light source so as not to be directly incident on said imaging member without illuminating the target object.

2. An apparatus according to claim 1, wherein said light source comprises a light emitting element, and a light guide for guiding light emitted from said light emitting element in a longitudinal direction and sending the light to the target object.

3. An apparatus according to claim 2, wherein said light-shielding member is part of a light-reflecting covering member which covers said light guide.

4. An apparatus according to claim 1, wherein said light-shielding member is part of a holding member which holds said light source and said imaging member.

5. An apparatus according to claim 1, further comprising photoelectric conversion means for converting optical information into an electrical signal, said photoelectric conversion means being arranged at an imaging position of said imaging member.

6. An apparatus according to claim 1, wherein said imaging member is a rod lens.

7. An optical system comprising:
   (a) a light source for illuminating a target object;
   (b) an imaging member for imaging light from the target object illuminated by said light source at an imaging position;
   (c) a light-shielding member for shielding the light coming from said light source so as not to be directly incident on said imaging member without illuminating the target object; and
   (d) control means for controlling said light source.

8. A system according to claim 7, wherein said light source comprises a light emitting element, and a light guide for guiding light emitted from said light emitting element in a longitudinal direction and sending the light to the target object.

9. A system according to claim 8, wherein said light-shielding member is part of a light-reflecting covering member which covers said light guide.

10. A system according to claim 7, wherein said light-shielding member is part of a holding member which holds said light source and said imaging member.

11. A system according to claim 7, further comprising photoelectric conversion means for converting optical information into an electrical signal, said photoelectric conversion means being arranged at an imaging position of said imaging member.

12. A system according to claim 7, wherein said imaging member is a rod lens.

13. An image reading system comprising:
   (a) a light source for illuminating a target object;
   (b) an imaging member for imaging light coming from the target object illuminated by said light source at an imaging position;
   (c) photoelectric conversion means for converting optical information imaged by said imaging member into an electrical signal;
   (d) a light-shielding member for shielding the light coming from said light source so as not to be directly incident on said imaging member without illuminating the target object; and
   (e) signal processing means for performing a predetermined processing on the electrical signal converted by said photoelectric conversion means.

14. A system according to claim 13, wherein said light source comprises a light emitting element, and a light guide for guiding light emitted from said light emitting element in a longitudinal direction and sending the light to the target object.

15. A system according to claim 14, wherein said light-shielding member is part of a light-reflecting covering member which covers said light guide.

16. A system according to claim 13, wherein said light-shielding member is part of a holding member which holds said light source and said imaging member.

17. A system according to claim 13, wherein said imaging member is a rod lens.

18. An image reading system comprising:
   (a) a light source for illuminating a target object;
   (b) an imaging member for imaging light coming from the target object illuminated by said light source at an imaging position;
   (c) photoelectric conversion means for converting optical information imaged by said imaging member into an electrical signal;
   (d) a light-shielding member for shielding the light coming from said light source so as not to be directly incident on said imaging member without illuminating the target object; and
   (e) transmission means for transmitting the image signal to an external processing apparatus.

19. A system according to claim 18, wherein said light source comprises a light emitting element, and a light guide for guiding light emitted from said light emitting element in a longitudinal direction and sending the light to the target object.

20. A system according to claim 19, wherein said light-shielding member is part of a light-reflecting covering member which covers said light guide.

21. A system according to claim 18, wherein said light-shielding member is part of a holding member which holds said light source and said imaging member.

22. A system according to claim 18, wherein said imaging member is a rod lens.

23. An image reading system comprising:
   (a) a light source for illuminating a target object;
   (b) an imaging member for imaging light coming from the target object illuminated by said light source at an imaging position;
   (c) photoelectric conversion means for converting optical information imaged by said imaging member into an electrical signal;
   (d) a light-shielding member for shielding the light coming from said light source so as not to be directly incident on said imaging member without illuminating the target object; and
   (e) moving means for moving the relative position of target object and said photoelectric conversion means.

24. A system according to claim 23, wherein said light source comprises a light emitting element, and a light guide for guiding light emitted from said light emitting element in a longitudinal direction and sending the light to the target object.

25. A system according to claim 24, wherein said light-shielding member is part of a light-reflecting covering member which covers said light guide.

26. A system according to claim 23, wherein said light-shielding member is part of a holding member which holds said light source and said imaging member.

27. A system according to claim 23, wherein said imaging member is a rod lens.

28. An image reading system comprising:
   (a) a light source for illuminating a target object;
   (b) an imaging member for imaging light coming from the target object illuminated by said light source at an imaging position;
   (c) photoelectric conversion means for converting optical information imaged by said imaging member into an electrical signal;
   (d) a light-shielding member for shielding the light coming from said light source so as not to be directly incident on said imaging member without illuminating the target object; and
   (e) control means for controlling said light source and said photoelectric conversion means.

29. A system according to claim 28, wherein said light source comprises a light emitting element, and a light guide for guiding light emitted from said light emitting element in a longitudinal direction and sending the light to the target object.

30. A system according to claim 29, wherein said light-shielding member is part of a light-reflecting covering member which covers said light guide.

31. A system according to claim 28, wherein said light-shielding member is part of a holding member which holds said light source and said imaging member.

32. A system according to claim 28, wherein said imaging member is a rod lens.

33. An image reading apparatus comprising:
   an illumination apparatus including a light emission element and a light guide member for guiding light emitted from said light emission element in a longitudinal direction to an object;
   a rod lens array including a plurality of rod lenses arranged along the longitudinal direction, each for forming an optical image of the object from light reflected from the object illuminated by said illumination apparatus;
   photoelectric conversion means for converting the optical image of the object, formed by said rod lens array, into an electrical signal; and
   a projection member positioned between said illumination apparatus and said rod lens array and projecting in a direction of an optical axis of the rod lenses from the end of the rod lens array to the object.

34. An apparatus according to claim 33, further comprising signal processing means for performing predetermined signal processing on the electrical signal converted by said photoelectric conversion means.

35. An apparatus according to claim 33, further comprising transmission means for transmitting the electrical signal to an external processing apparatus.

36. An apparatus according to claim 33, further comprising contorl means for controlling said illumination apparatus and said photoelectric conversion means.

37. An image reading system comprising:
   (a) an image reading apparatus including:
      an illumination apparatus including a light emissions element and a light guide member for guiding light emitted from said light emission element in a longitudinal direction to an object;
      a rod lens array including a plurality of rod lenses arranged along the londitudinal direction, each for forming an optical image of the object from light reflected from the object illuminated by said illumination apparatus;
      photoelectric conversion means for converting the optical image of the object, formed by said rod lens array, into an electrical signal; and
      a projection member positioned between said illumination apparatus and said rod lens array and project ing in a direction of an optical axis of the rod lenses from the end of the rod lens array to the object; and (b) moving means for moving a relative position of the object and said photoelectric conversion means.

38. A system according to claim 37, further comprising signal processing means for performing a predetermined signal processing on the electrical signal converted by said photoelectric conversion means.

39. A system according to claim 37, further comprising transmission means for transmitting the electrical signal to an external processing apparatus.

40. A system according to claim 37, further comprising control means for controlling said illumination apparatus and said photoelectric conversion means.

* * * * *